United States Patent [19]

Sips et al.

[11] Patent Number: 5,796,950
[45] Date of Patent: Aug. 18, 1998

[54] METHOD OF DETECTING SERVICE INTERACTIONS IN INTELLIGENT NETWORKS

[75] Inventors: Johan Willem Sips, Voorburg; Alfonsius Antonius Johannes Melisse, Rijen; Eric Bryan Kuisch, Gouda; Ronaldus Gerardus Johannes Janmaat, Voorschoten, all of Netherlands

[73] Assignee: Koninklijke PTT Nederland N.V., Groningen, Netherlands

[21] Appl. No.: 687,426

[22] PCT Filed: Feb. 9, 1995

[86] PCT No.: PCT/EP95/00460

§ 371 Date: Aug. 9, 1996

§ 102(e) Date: Aug. 9, 1996

[87] PCT Pub. No.: WO95/22231

PCT Pub. Date: Aug. 17, 1995

[30] Foreign Application Priority Data

Feb. 9, 1994 [EP] European Pat. Off. ......... 94200299

[51] Int. Cl.$^6$ .................................................. B42F 17/34
[52] U.S. Cl. ........................ 395/200.48; 395/200.51; 395/200.56; 379/201; 379/157; 379/26
[58] Field of Search ............................ 379/201, 157, 379/26, 34; 395/200.32, 200.48, 200.51, 200.52, 200.56, 200.74

[56] References Cited

U.S. PATENT DOCUMENTS 5,404,396   4/1995   Brennan ...................... 379/201

*Primary Examiner*—Thomas Peeso
*Attorney, Agent, or Firm*—Oblon, Spivak, McClelland, Maier & Neustadt, P.C.

[57] ABSTRACT

The invention provides a method of detecting service interactions in intelligent networks. According to the invention, the detection method comprises a first stage in which services are formally specified and a second stage in which the thus specified services are checked for possible interactions. In the formal specification, use is made of conditions defining the execution of the services, such as pre conditions, post conditions and global conditions. The second stage is suitable for computer-assisted execution.

3 Claims, 4 Drawing Sheets

METHOD OF DETECTING SERVICE INTERACTIONS IN INTELLIGENT NETWORKS

BACKGROUND OF THE INVENTION

The present invention relates to a method of detecting service interactions in intelligent networks. More specifically, the present invention relates to the specifying of services, and to a method of detecting service interactions based on specifications.

In modern telecommunications networks, operators increasingly offer additional services to their customers. Examples of services are Originating Call Screening (OCS), Virtual Private Network (VPN), Follow On Call (FOC) and Language Selection (LGS). However, as the number of services increases, the likelihood of interactions between those services increases as well. In most cases, these interactions are unwanted, as they may occur unexpectedly and may produce undesired effects. Therefore, the occurrence of interactions of services should be detected and prevented, preferably in the design stage of the services.

Prior art methods of detection of service interactions were primarily concerned with the comparison of textual descriptions of services. This known approach has the disadvantages of being inaccurate, as textual descriptions are often vague and ambiguous, and time-consuming, as numerous services specifications have to be compared by hand.

Reference 1 ("A Practical Approach to Service Interactions") suggests using a more structured approach to the detection of service interactions, using conditions to specify services and to detect possible interactions. However, this reference does nor offer a complete detection method which may be carried out by computer.

Reference 8 ("A Verification Scheme for Service Specifications Described by Information Sequence Charts") proposes a method of detecting service interactions which may be carried out by computer. However, this known method is solely based on chronological mistakes and fails to detect all possible errors.

Reference 9 ("Administrable feature interaction concept") discloses the use of trigger points in the detection of interactions. Only the priority order of additional services (or "features") is used to detect possible interactions.

SUMMARY OF THE INVENTION

An object of the present invention is to provide a method of detecting service interactions which can be carried out, at least in part, by computer.

A further object of the present invention is to provide a complete and reliable method of detecting service interactions.

A still further object of the present invention is to provide a method of specifying services which provides unambiguous descriptions of services permitting the automatic processing of those descriptions for interaction detection purposes.

Accordingly, a method of detecting interactions of services in networks, the method comprising the pairwise comparison of features of services during a call, the services being modeled as external stares of a basic call state model, the features comprising conditions associated with the services, the conditions comprising preconditions defining the state of the model prior to the execution of the service, and postconditions defining the state of the model after the execution of the service, is according to the present invention characrerised in that the conditions further comprise global conditions defining a condition of the model during the entire call, global pre conditions defining a condition of the model during the call until the execution of the service, and global post conditions defining a condition of the model during the call after the execution of the service.

By using formal specifications using the conditions mentioned above, an exact and unambiguous detection of interaction of services can be provided. By verifying the formally specified conditions, a process is provided which can easily be automated and which produces highly reliable results.

REFERENCES

|1| E. Kuisch et al.: "A Practical Approach to Service Interactions", IEEE Communications Magazine, August 1993, pp. 24–31.

|2| An axiomatic basis for computer programming, Comm ACM 12 (October 1969), 576–580, 583.

|3| ITU (CCITT) Recommendation Q.1211, Introduction to Intelligent Network for Capability Set 1.

|4| ITU (CCITT) Recommendation Q.1214, Distributed Functional Plane for Capability Set 1.

|5| ETSI draft ETR NA601-09, Service Life Cycle Reference Model, (July 1993).

|6| European Patent Application 94200299.9.

|7| ITU Recommendation Q.1204.

|8| Okamoto et al.: "A Verification Scheme for Service Specifications Described by Information Sequence Charts", IEICE Transactions on Communications, Vol. E75-B, no. 10, pp. 978–985, Tokyo, October 1992.

|9| Schessel: "Administrable feature interaction concept", International Switching Symposium, Yokohama, 1992.

BRIEF DESCRIPTION OF THE DRAWINGS

The invention will now further be described by reference to the accompanying drawings, in which.

DETAILED DESCRIPTION OF THE INVENTION

I. Call Modelling

In this document, the term "ASP" will be understood to mean "Additional Service Processing", i.e. the processing or execution of a service additional to the Basic Call State Model (BCSM). More specifically, APSs will in general be understood to have been specified independently, i.e. it is assumed that ASPs are not designed to cooperate.

Figure 1:
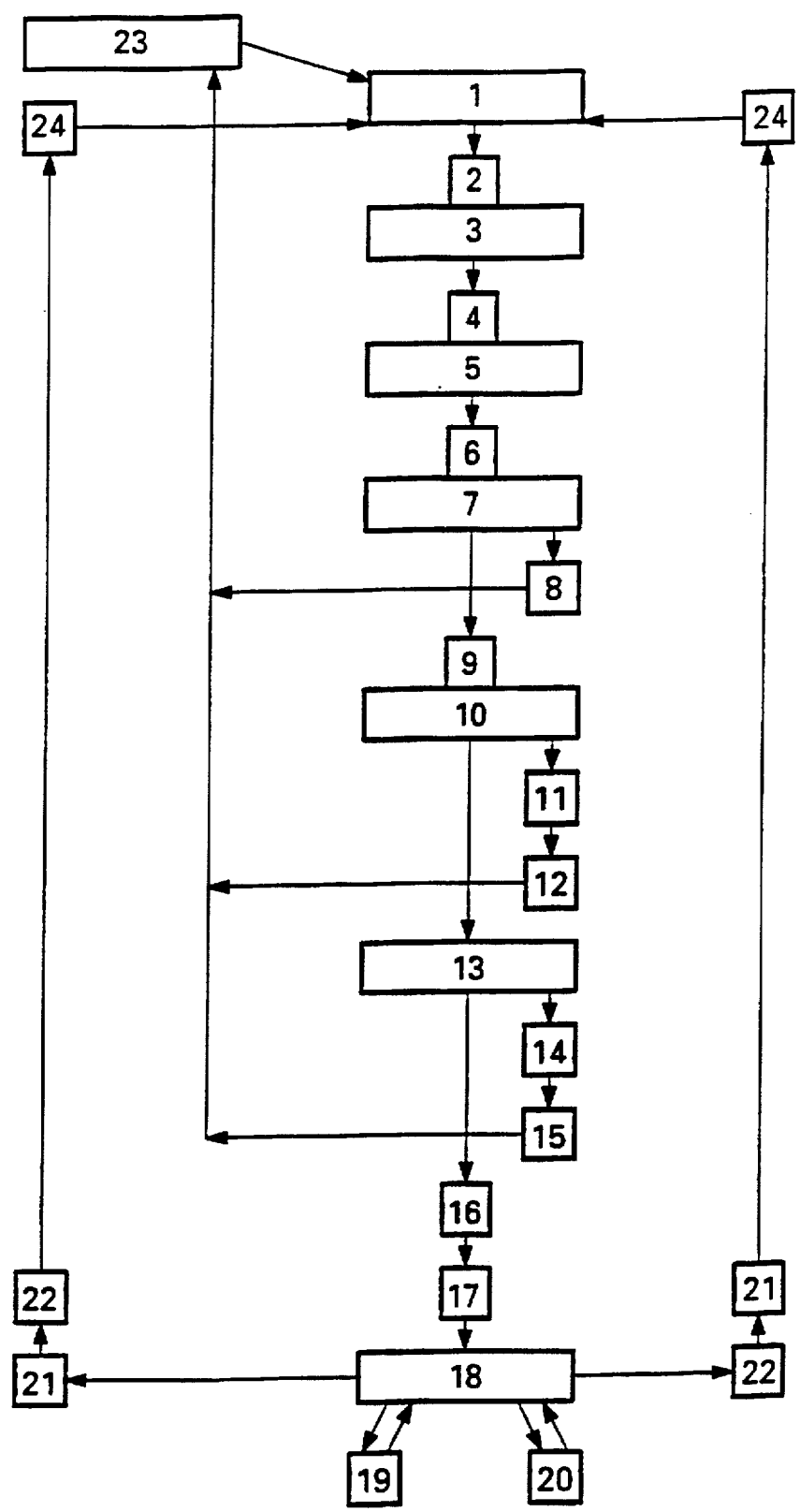
FIG. 1 schematically shows a Basic Call Stare Model as used in the method of the present invention.

The Basic Call State Model (BCSM) preferably used in the method of the present invention is depicted schematically in FIG. 1. This BCSM comprises a number of steps or stages each corresponding with states in a call. The BCSM of FIG. 1 combines the Originating BCSM and the Terminating BCSM of ITU Recommendation Q.1204, thus integrating the originating and termination call.

The respective states (detection points) of the present BCSM, as rendered schematically in FIG. 1, are:
1. Null (original or rest state)
2. Originating_Attempt_Authorized
3. Collect_Info
4. Info_Collected
5. Analyze_Info
6. Info_Analyzed
7. Routing
8. Route_Select_Failure
9. Terminating_Attempt_Authorized
10. Select_Facilities & Present Call
11. T_Called_Party_Busy
12. O_Called_Party_Busy
13. Alerting
14. T_No_Answer
15. O_No_Answer
16. T_Answer
17. O_Answer
18. Active
19. O_Mid_Call
20. T_Mid_Call
21. O_Disconnect
22. T_Disconnect
23. O_Exception
24. Abandon.

It will be understood that in the above list, the prefix "O" refers to "Originating" (call or party) while "T" refers to "Terminating" (call or party). The BCSM of FIG. 1 has the advantage that the numbers assigned to the detection points are suitable for time reference, as higher numbers refer to events later in time. This facilitates computerized operations. For further details of Basic Call State Models reference is made to [7].

In the method of the present invention, the influence of services, such as Intelligent Network (IN) services on the Basic Call State Model (BCSM) is described by (e.g. graphically) extending the BCSM with external states called the Additional Service Processing (ASP) states. That is, services are described as additional states of the BCSM.

II. Specification of Services

According to the present invention, services are formally described by means of conditions, such as pre conditions and post conditions. Pre and post conditions describe a function (e.g. an ASP) of a system (e.g. an intelligent network) in terms of states of the system. Pre and post conditions describe what the function is by defining the states prior to and after the execution of the function, rather than how the particular function is performed.

Figure 2:
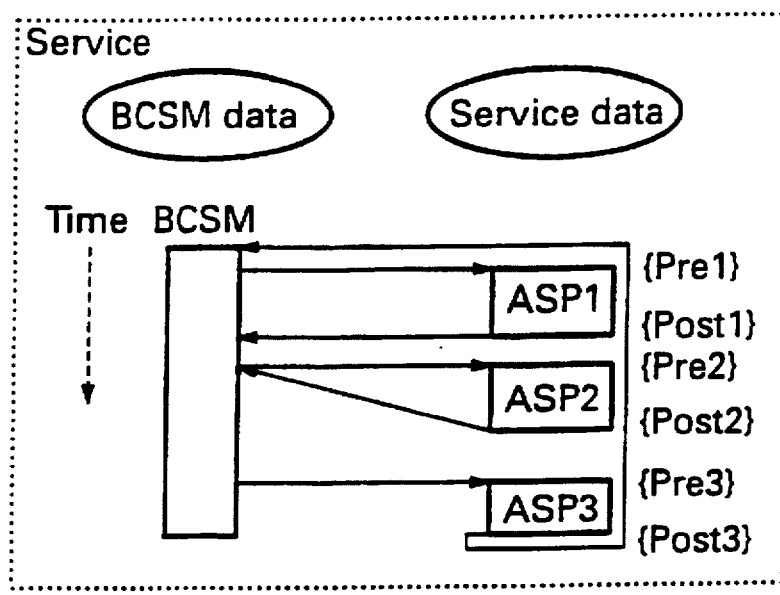
FIG. 2 schematically shows a representation of additional services in relationship with the Basic Call State Model.

A service model including pre and post conditions is depicted in FIG. 2. Three ASPs (ASP1, ASP2 and ASP3) interact with the BSCM, the interactions being schematically rendered by arrows between the BCSM and the ASPs. These arrows, as used in FIG. 2, schematically depict the points in time (detection points) when the execution of the BCSM is interrupted in order to execute an ASP, that is, where the BCSM is exited and where it is returned to (see also FIG. 1).

Before and after the execution of each ASP, certain pre and post conditions hold. For example, before the execution of ASP1 the pre condition Pre1 holds in the BCSM. After the execution of ASP1, post condition Post1 holds. Thus, the behaviour of ASP1 is defined, at least in part, by the conditions Pre1 and Post1. Similarly, conditions Pre2 and Post2 are associated with ASP2, and conditions Pre3 and Post3 are associated with ASP3.

In addition to pre and post conditions, the following conditions are identified:

global conditions (proper), holding during the entire call;
global pre conditions, holding until the moment of execution of an ASP;
global post conditions, holding after the end of an ASP until the end of a call.

Figure 3:
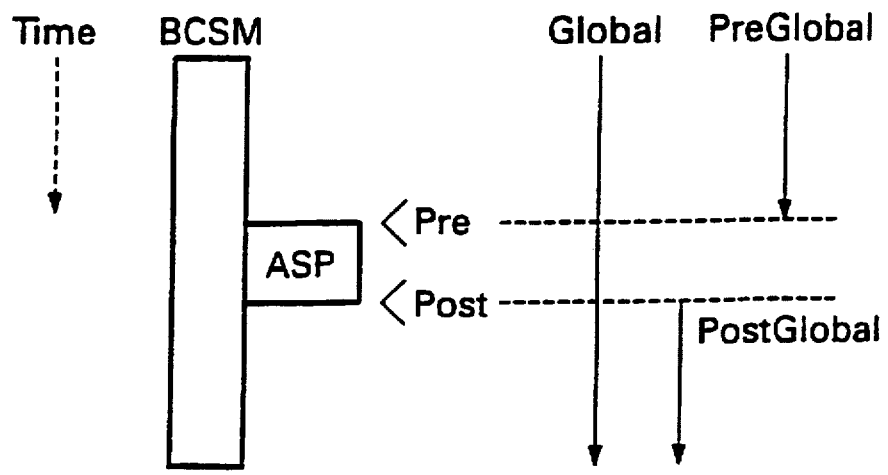
FIG. 3 schematically shows the applicable ranges of the conditions of an additional service (ASP)

The time relationships of the various conditions are depicted in FIG. 3. Global conditions hold before, during and after the execution of the ASP concerned. It will be understood that, for a particular ASP, only those global conditions have to be taken into consideration which affect the ASP or which may be affected by the ASP in question. Global preconditions (denoted "PreGlobal" in FIG. 3) hold until the execution of the ASP, global postconditions (denoted "PostGlobal" in FIG. 3) hold after the execution of the ASP. Pre and post conditions (denoted "Pre" and "Post" in FIG. 3) hold at the beginning and at the end of the execution of the ASP respectively, a pre condition being a prerequisite for the ASP to be executed and a post condition being established by the execution of the ASP. (Note that for the sake of clarity, in FIG. 3 exit and return are not indicated by arrows as in FIG. 2).

The behaviour of an ASP can, in accordance with the present invention, be expressed as:

```
{global condition}
{global pre condition ASP}
{pre condition ASP}
   ASP
{post condition ASP}
{global post condition ASP}
```

In addition to conditions, different types of data pertinent to the ASP can be identified: BCSM Data, BCSM State Information, Service Data, and User Interaction Data. BCSM Data are data used by the BCSM, e.g. CallingPartyNumber and CalledPartyNumber. BCSM Data are transferred between the BCSM and the ASPs. BCSM State Information refers to the states of the BCSM. This information is exchanged between the BCSM and an ASP at the beginning and at the end of the execution of an ASP. Service Data are specific data for a particular service, e.g. a personal number. Service Data are not exchanged between BCSM and ASPs. User Interaction Data pertain to the communication of the service with end users. It comprises announcements to the users and collected information (CollectedInfo) from the users. User Interaction Data are exchanged between the BCSM and ASPs. The above data types together constitute the data environment of a service.

An attribute is constituted by data common to all processes concerned. In the present case an attribute is data known to both the BCSM and an ASP, and used to influence each other's behaviour. The prime importance of attributes lies in the unambiguous assignment of names to different (types of) data. Attributes can either be BCSM Data (e.g. CallingPartyNumber, CalledPartyNumber), BCSM State Information (e.g. Exit, Return, ReturnState, EDP_Set) or User Interaction Data (e.g. Announcements, CollectedInfo).

III. Detection Method

The detection method of the present invention comprises the pairwise comparison of features at specification time. ASPs which are specified as set out above can easily be compared and checked for interaction. It is assumed that the ASPs are conjunct, the ASPs to be checked each have only one return. Furthermore, it is assumed that of each pair of ASPs to be checked, the first ASP (ASP1) exits before the second ASP (ASP2) exits. In other words, ASP1 leaves the BCSM at an earlier stage than ASP2. This will be written symbolically as: exit1<exit2, the mark "<" meaning "earlier in time". In case ASP2 exits before ASP1 (exit1>exit2, the mark ">" meaning "later in time", and, in the BCSM of FIG. 1, also meaning a higher detection point reference number), the ASPs should be interchanged to meet the above assumption. In case the ASPs exit at the same time (exit1=exit2, the mark "=" meaning "at the same point in time"), the detection method should be applied twice, interchanging ASP1 and ASP2 after the first time.

In FIG. 5, exits and returns are schematically depicted, exits being denoted by arrows pointing from the BSCM towards the ASPs and returns being denoted by arrows pointing from the ASPs towards the BCSM.

Reference numerals 1, 2, 3 and 4 respectively refer to four consecutive (detection) points in the BCSM. It should be noted that the magnitude of said reference numerals have no bearing on the detection points in FIG. 1.

Figures 5A, 5B, 5C:
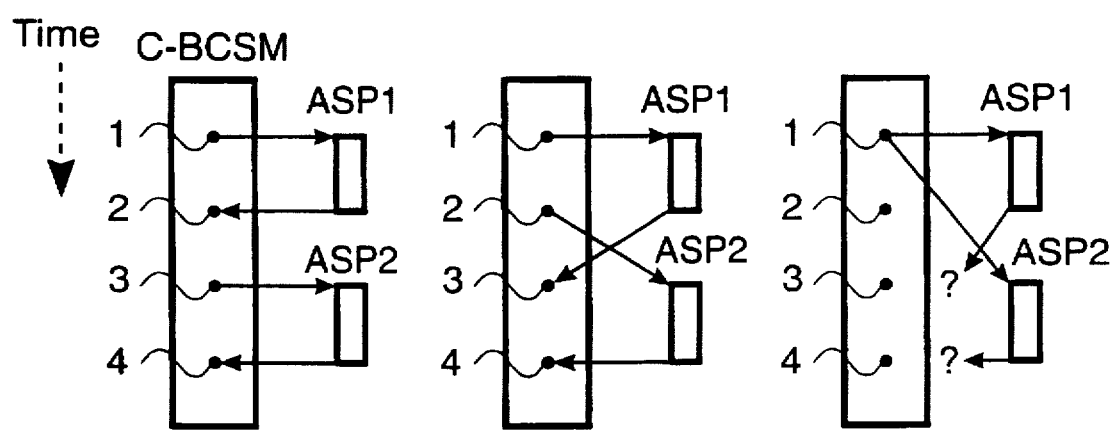
FIGS. 5a, 5b and 5c schematically show possible interaction cases.
Figure 6:
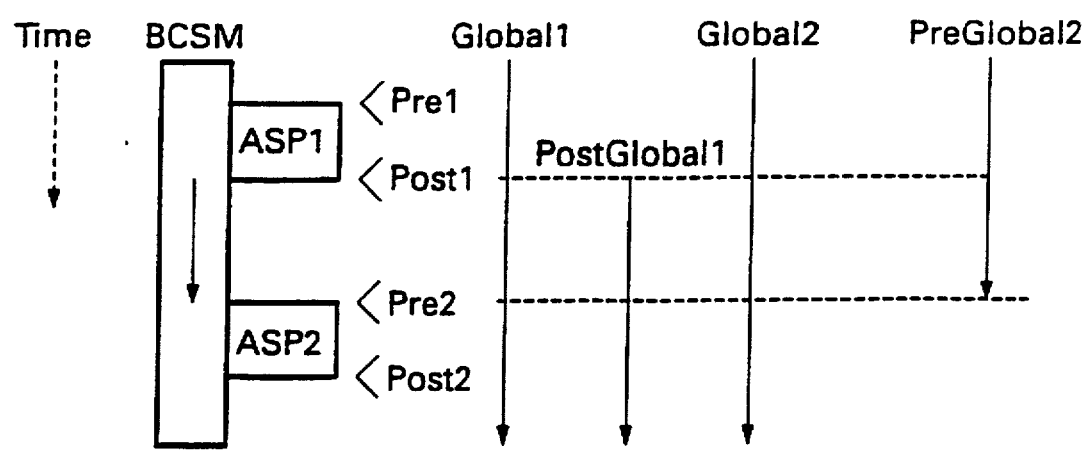
FIG. 6 schematically shows the applicable ranges of the conditions of a pair of additional services (ASPs).

In FIG. 5a, ASP1 exits (1) and returns (2) before ASP2 exits (3): exit1<exit2 and return1<exit2. In FIG. 5b, exit1<exit2 but return1>exit2: return1 is associated with point 3, while exit2 is associated with point 2. In FIG. 5c, exit1=exit2 (point 1). In the case of FIG. 5c interaction of the two ASPs may be expected.

It is noted that the term C-BCSM (Centralised BCSM) used in FIG. 5 refers to the BCSM of FIG. 1, that is, the centralised call model in which O-BCSM and T_BCSM are combined (see also Reference 4).

As stated above, the method of the present invention has as preliminary steps (i) dissecting ASPs in conjunctive parts and (ii) comparing exit and return information of pairs of ASPs, denoting the ASP with the earliest exit (the smallest exit state, i.e. the detection point having the lowest number, in the BCSM of FIG. 1) ASP1 and denoting the other one ASP2. Subsequently, the following steps may be performed in order to detect potential interactions of the ASPs:

1. If return1>exit2 go to step 5.

2. If ASP1 maintains an existing control relationship go to step 5.

3. If (return2>exit1) or (exit1=exit2 and return2≧exit2):
    Verify {Pre1} CallProcessing(exit1,exit2) {Pre2} and
    Verify {Post1 and PostGlobal1 and Global1} CallProcessing(return2, exit1) {Pre2}
    3.1. If one of either statements is true and one is false then "Interaction because of conflict of control" (ASP1 influences control of ASP2). Go to step 6.
    3.2. If both statements are true then:
        Verify {PreGlobal2 and Global1 and Pre1} ASP1 {PreGlobal2 and Global2 and Post1} and
        Verify {PostGlobal1 and Global1 and Pre2} ASP2 {PostGlobal1 and Global2 and Post2} and
        3.2.1. If (only) one of both statements is false then "Interaction".
        3.2.2 Go to step 6.

4. If (return2≦exit1) and (exit1≠exit2 or return2<exit2):
    Verify {Post2 and Global2 and PostGlobal2 and PreGlobal2} CallProcessing(return2,exit1) {Pre 1 }
    4.1 If false and repeated execution of ASP1 is desired then "Interaction" (ASP1 should be executed but will not).
    4.2 If true and repeated execution of ASP1 is not desired then "Interaction" (because of undesired re-execution).
    4.3 Go to step 6.

5. Verify: {Pre1} CallProcessing(exit1, exit2) {Pre2} If true: "Interaction" (because of conflict of control).

6. If the ASPs can occur in a call involving three parties then
    6.1 If both ASPs operate on terminating parties then verify:
        {PostGlobal1 and Global1 and Pre2} ASP2 {PostGlobal1 and Global1 and Post2} and
        {PreGlobal2 and Global2 and Pre1} ASP1 {PreGlobal2 and Global2 and Post1}
    6.2 If false then "Interaction" (because of conflict in conditions).

7. If the ASPs occur in independent sessions then verify:
    {PostGlobal1 and Global1 and Pre2} ASP2 {PostGlobal1 and Global1 and Post2}
    {PreGlobal2 and Global2 and Pre1} ASP1 {PreGlobal2 and Global2 and Post1} and
    {PostGlobal2 and Global2 and Pre1} ASP1 {PostGlobal2 and Global2 and Post1}
    {PreGlobal1 and Global1 and Pre2} ASP2 {PreGlobal1 and Global1 and Post2}
    7.1 If false then "Interaction" (because of conflict in conditions).

If other conjunctive ASP combinations have to be considered then return to step 1.

The control relationships mentioned above can be identified by means of the BCSM State Information EDP_Set (comprising DetectionPointNumber and RelationshipID).

With the above method, interactions can readily be detected, either manually or computer-assisted, and a network free of interactions can be realized.

The verification rules of the method of the present invention accordingly have the format {P} S {Q}, where P and Q are conditions and S is a process (ASP). In a verification rule:

if P does not hold: conclude FALSE.

if P holds and {P} S {Q} holds: conclude TRUE.

if P holds and {P} S {Q} does not hold: conclude FALSE.

Figure 4:
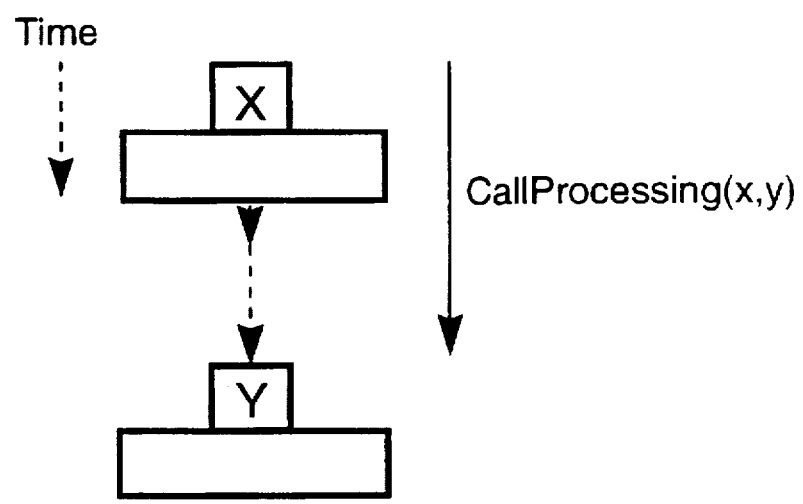
FIG. 4 schematically shops the processing of a call.

The process S can also be denoted by CallProcessing(x,y), as depicted in FIG. 4, representing the transition from a state x to a state y in the BCSM. State x may, for example, be exit1, while state y may be exit2.

As stated above, the method of the invention applies logical verification rules to formal specification rules in order to detect potential interaction cases.

IV. Examples

In the examples, the sign ∧ means "logical AND", while the sign ∨ means "logical OR". The sign ¬ means "logical NOT". The sign ⊕ indicates concatenation. To indicate that some data exist and have a non-specific value ("don't care") the notation <dataname◊> is used, e.g. CalledPartyNumber◊ (here the enclosing signs < and > are used to specify a data example). To indicate that some data are not available (and have no value), the 'value' NILL is used.

The function "Screen" evaluates a logical statement, i.e. checks occurrences. E.g. Screen(<Value_list>, <Column_list>, <Table_name>) provides the boolean result of the question whether in the columns <Columns_list> of table <Table_name> the values <Value_list> are available. Comments in the specifications of the examples are given between /* and */.

EXAMPLE 1

The following example will show the application of the method for deriving pre and post conditions from a textual description in ten steps. The example will use the Originating Call Screening service (OCS):

"Originating calls may be controlled by the Originating Call Screening capability. This allows the subscriber to specify that outgoing calls be either restricted or allowed, according to a screening list and, optionally, by time of day control. This can be overridden on a per-call basis by anyone with the proper identity code."
[3]

The OCS service used here will contain a list of numbers that are not allowed; besides, for reasons of simplicity, the passing of the screening by using identity codes will not be taken into account.

Following the method of the present invention, the following steps are taken:

Step 1 requires to identify a database structure for OCS; since OCS is expected to be active, we abstract from the data used to indicate the OCS activation status. The following database structure will be used:

OCS-table: CallingParty & CalledParty with key: (CallingParty,CalledParty) and the data type of CallingParty and CalledParty being resp.

CallingPartyNumber and CalledPartyNumber.

The interpretation of this table is: the occurrence of (CallingParty, CalledParty) in OCS-table means that a call from CallingParty (originating side) to CalledParty (terminating side) is not allowed. Because of this interpretation both columns in such a table should be marked: the column CallingParty is related to the attribute CallingPartyNumber and CalledParty to CalledParryNumber.

It should be noted that the BCSM data CallingPartyNumber, indicating the location of the originating party, and CalledPartyNumber, indicating the dialled digits or the location of the terminating parry, are data of the type: list of E.164 type (also see the international data standard E.164).

In step 2 (defining a global expression in term of the goal of the service), the expression of the goal is: when a call is active, the CallingPartyNumber and CalledPartyNumber will not occur as a row in the OCS-table. Or using attributes (using BCSM_State to indicate the state of the BCSM):

---

¬(BCSM_State = Active $\wedge$
Screen((Last(CallingPartyNumber), Last(CalledPartyNumber)),
(CallingParty, CalledParty), OCS-table) = TRUE)

---

Step 3 (stepping through the detection points in the BCSM and identifying the actions to be performed) leads to the conclusion that Info_Analysed is the proper detection point (6 in FIG. 1) to start the only OCS-ASP. Stepping through the ASPs for OCS is restricted to one ASP.

Step 4 (determining a trigger condition for the ASP and using this as the first part of a pre condition) leads to the following pre condition:

---

{/* trigger criteria */ Exit = 6 $\wedge$
/* other attributes */ CallingPartyNumber = CallingPartyNumber0 $\wedge$
CalledPartyNumber = CalledPartyNumber0 $\wedge$ EDP_SET =
EDP_Set0 $\wedge$
Announcements = Announcements0 $\wedge$ CollectedInfo = CollectedInfo0
},

--- where EDPhd —SET is the set of (exit) detection points concerned.

In step 5 (characterising the ASP in general terms) the goal of the ASP is determined: check whether a call is allowed or not. The following cases can be identified. For OCS those cases are related to the possible paths after the screening has been performed; three cases are possible:

- the pair (Last(CallingPartyNumber0), Last (CalledPartyNumber0)) is not found in OCS-table; this means that the call is allowed;

- the pair (Last(CallingPartyNumber0), Last (CalledPartyNumber0)) is found in OCS-table; this means that the call is not allowed;

- something went wrong during the execution of the ASP.

Step 6 (stepping through all attributes and determining whether they will be used in the ASP) leads to the following attributes:

CallingPartyNumber and CalledPartyNumber (mentioned in step 1)

Announcements (because of the need to inform a user when something goes wrong or when the call is not passed)

Exit and Return (used to indicate the begin resp. end of the ASP) Step 7 (for each attribute found in step 6 and used as input, determine its use, per case as in step 5, in operations on the database structure): it is possible to write the cases (step 5) in the following format, being the base for the post condition:

---

{(/* the call is allowed */
  Screen((Last(CallingPartyNumber0), Last(CalledPartyNumber0)),
  (CallingParty, CalledParty), OCS-table) = FALSE) ... ) $\vee$
(/* the call is not allowed */
  Screen((Last(CallingPartyNumber0), Last(CalledPartyNumber0)),
  (CallingParty, CalledParty), OCS-table) = TRUE) ... ) $\vee$
(/* something went wrong */
  SLE_Error ... )
}

---

It is noted that SLE_Error is a variable expressing that some error has occurred during the execution of the service logic (e.g. operations on non-existing databases) due to which the call is cleared.

In step 8 (determine per case, as in step 5, the value of each attribute used as output in terms of the database structure of step 1 and the operations of step 7, and write those operations in the post condition, separated by logical ORs) the post condition is extended: in the case in which the call is allowed, nothing is changed except the Return; in the case in which the call is not allowed and in the case where something went wrong the CallingPartyNumber is assigned to NILL and Announcement is changed.

This yields:

---

{ (/* the call is allowed */
  Screen((Last(CallingPartyNumber0),Last(CalledPartyNumber0)),
  (CallingParty, CalledParty), OCS-table) = FALSE)
  $\wedge$ Return= 6 ... ) $\vee$
(/* the call is not allowed */
  Screen((Last(CallingPartyNumber0),Last(CalledPartyNumber0)),)
  (CallingParty, CalledParty), OCS-table) = TRUE) $\wedge$
  Return= 1 $\wedge$ CalledPartyNumber = CalledPartyNumber0 $\oplus$ NILL $\wedge$
  Announcements = Announcements0 $\oplus$ "it is not allowed to call this
  number" ... ) $\vee$
(/* something went wrong */
  SLE_Error $\wedge$ Return= 1 $\wedge$

---

```
CalledPartyNumber = CalledPartyNumber0 ⊕ NILL ∧
Announcements = Announcements0 ⊕ "Sorry, something
    went wrong" ... )
}
```

Step 9 (check if all attributes mentioned in the pre condition occur in at least one of the cases of the post condition, remove non-occurring expressions) leads to the removal of EDP_SET and CollectedInfo from the pre condition:

```
{/* trigger criteria */ Exit = 6 ∧
  /* other attributes */ CallingPartyNumber = CallingPartyNumber0 ∧
  CalledPartyNumber = CalledPartyNumber0 ∧ Announcements =
    Announcements0}
```

Step 10 (check if each attribute mentioned in the pre condition occurs in all cases of the post condition, if not, add where the attribute is missing an expression to assign the initial value or NILL |empty| to the attribute) results in the following post condition:

```
{
(/* the call is allowed */
Screen((Last(CallingPartyNumber0), Last(CalledPartyNumber0)),
  (CallingParty, CalledParty), OCS-table) = FALSE) ∧ Return = 6 ∧
  Announcements= Announcements0 ∧
  CallingPartyNumber = CallingPartyNumber0 ∧
  CalledPartyNumber = CalledPartyNumber0) ∨
(/* the call is not allowed */
Screen((Last(CallingPartyNumber0), Last(CalledPartyNumber0)),
  (CallingParty, CalledParty), OCS-table) = TRUE) ∧ Return= 1 ∧
  CalledPartyNumber = CalledPartyNumber0 ⊕ NILL ∧
  CallingPartyNumber = CallingPartyNumber0 ∧
  Announcements = Announcements0 ⊕ "it is not allowed to
    call this number") ∨
(/* something went wrong */
  SLE_Error ∧ Return= 1 ∧
  CalledPartyNumber = CalledPartyNumber0 ⊕ NILL ∧
  CallingPartyNumber = CallingPartyNumber0 ∧
  Announcements = Announcements0 ∧ "Sorry, something went
    wrong") }
```

In step 11 (checking if there is a part of the post condition that should hold during several states of the BCSM and stating it as global post condition; and checking if there is a part of the pre condition that should hold during several states of the BCSM and stating it as global pre condition) it is concluded that the CalledPartyNumber, if it is an ordinary telephone number, may not be changed after this check. So the expressions assigning a value to CalledPartyNumber should be regarded as global conditions. This finalises the derivation of pre and post conditions for OCS:

```
{
  /*trigger criteria*/ Exit=6 ∧
  /*other attributes*/ CallingPartyNumber = CallingPartyNumber0 ∧
  CalledPartyNymber=CalledPartyNumber0 ∧ Announcements =
    Announcements0
}
OCS
{
(/*the call is allowed*/
Screen ((Last(CallingPartyNumber0), Last(CalledPartyNumber0)),
  (CallingParty, CalledParty),OCS-table)= FALSE) ∧ Return=6 ∧
  Announcements = Announcements0 ∧
  CallingPartyNumber = CalledPartyNumber0 ∧
  CalledPartyNumber=CalledPartyNumber0) ∨
(/*the call is not allowed*/ Screen((Last(CallingPartyNumber0),
  Last(CalledPartyNumber0)), (CallingParty, CalledParty),OCS-table)=
    TRUE) ∧ Return=1 ∧ CalledPartyNumber=CalledPartyNumber0 ⊕
    NILL ∧ CallingPartyNumber=CallingPartyNumber0 ∧
    Announcements=Announcements0 ⊕ "it is not allowed to call this
    number") ∨
(/*something went wrong*/
  SLE_Error ∧ Return=1 ∧ CalledPartyNumber=
    CalledPartyNumber0
  ⊕ NILL ∧ CallingPartyNumber=CallingPartyNumber0 ∧
  Announcements=Announcements0 ⊕ "Sorry, something went wrong")
}
{ /*global post condition*/
  ¬(Class(CalledPartyNumber) = OrdinaryTelephoneNumber ∧
  CalledPartyNumber ≠ CalledPartyNumber0 ∧
  CalledPartyNumber ≠ (CalledPartyNumber0 ⊕ NILL))
}
```

Taking into account the global condition and the result of the screening, due to the OCS ASP, one can easily see that the global condition, stated in step 2, is reflected by the global post condition above if the BCSM is in the Active state.

EXAMPLE 2

In this example a simple specification for Outgoing Call Screening (OCS), using a "black list" of unaccessible numbers, and Abbreviated Dialling (ABD) will be used. CPN (and cpn) will be used as abbreviation for called party number.

```
OCS_T : OCSList
{ exit = 4 ∧ cpn = CPN1}
OCS
{ (Screen(cpn, OCS_T) = False ∧ cpn = CPN1 ∧ return = 4)
  ∨
  (Screen(cpn, OCS_T) = True ∧ cpn = CPN1 ∧ return = 1)
}
{PostGlobal: cpn=CPN1}
```

The conditions make use of the specification variable (with constant, but unknown, value) CPN1. Hence the global post condition, which has to be maintained by every other ASP states so that the called party number may not be changed.

In this example the following dissected case will be used:

```
Post: ((Screen(cpn, OCS_T) = False ∧ cpn = CPN1 ∧ return = 4)
ABD_T : ABDNr & TransNr
{ exit = 4 (Collected_Info) ∧ cpn = CPN0 }
ABD
{ return = 4 (Collected_Info) ∧ cpn = translate(CPN0, ABDNr,
  ABD_T)}
```

When looking at the profile it can be concluded that for detection purposes two cases (because exit_OCS=exit_ABD) should be considered: |ABD; OCS| and |OCS; ABD|. For this example only |OCS; ABD| will be investigated.

The rule to be verified first is:

{Post1} CallProcessing(return2, exit1) {Pre2}, which in this example looks like:

```
{ (Screen(cpn, OCS_T) = False ∧ cpn = CPN1 ) }
    CallProcessing(4,4)
{ cpn = CPN0 }
```

This is only true when CPN1=CPN0, but since CPN1 and CPN0 are specification variables CPN0=CPN1 will hold.

The case CPN0=CPN1 obliges us to verify the rules with the global conditions, in this case one of them (the second) looks like:

```
{ cpn=CPN1 and cpn=CPN0 }
    ABD
{ cpn=CPN1 and cpn = translate(CPN0, ABDNr, ABD_T) }
```

Since CPN0=CPN1 and translate(CPN0, ABDNr, ABD_T) will definitely result in a value which differs from CPN0, this global condition is violated: interaction detected for this case, i.e. interaction is possible for the combination ABD and OCS. Note that when no global condition is used in this case, no interaction can be detected.

EXAMPLE 3

Origin Dependent Routing (ODR) and Time Dependent Routing (TDR) will be used in this example. Both are considered as originating features.

```
ODR_T : CalledPartyNumber & CallingPartyNr & TransNr
{ exit = 4 ∧ cpn[1 ... 2]= "88" ∧ cpn = CPN0 ∧
CallingPartyNr = Calling-
PartyNr0 }
ODR
{ return = 7 (routing) ∧ cpn = translate({CPN0, CallingPartyNr0},
    {CalledPartyNumber, CallingPartyNr}, ODR_T)
}
TDR_T : CalledPartyNumber & Time & TransNr
{ exit = 4 ∧ cpn[1 ... 2] = "89" ∧ cpn = CPN1 }
TDR
{return = 7 ∧ cpn = translate({CPN1, system_time},
    {CalledPartyNumber, Time}, TDR_T)
}
```

Since exit_ODR and exit_TDR are identical, two cases have to be considered. In this example only [ODR; TDR] will be considered. Because return_ODR>exit_TDR, there is a possible conflict of control and the following verification rule needs to be checked:

```
{Pre1} CallProcessing(exit1,exit2) {Pre2}
I.e:
{ cpn|1 ... 2|= "88" ∧ cpn = CPN0 ∧ CallingPartyNr =
CallingPartyNr0}
    CallProcessing(4,4)
{ cpn|1 ... 2| = "89" ∧ cpn = CPN1 }
```

Since CallProcessing(4,4) equals doing nothing, the value of cpn|1..2| will not change, hence this rule does not hold. Therefore, interaction does not occur.

This example is rather illustrative for the often simple application of the method of the invention.

It will be understood by those skilled in the art that the above examples are for illustration purposes only and that various modifications and additions can be made without departing from the scope of the present invention.

We claim:

1. A method of detecting interactions of services in networks having stations which are selectively connectable together during a basic call state, the method comprising:

establishing a model of the basic call state;

modeling said services as external states of the basic call state model;

pairwise comparing features of the services during an established call between at least two of the stations, wherein the features include conditions associated with the services, the conditions comprising preconditions defining the state of the basic call state model prior to execution of a service, post conditions defining the state of the basic call state model after execution of the service, global conditions defining a condition of the basic call state model during an entire call, global preconditions defining a condition of the basic call state model during the call until the execution of the service, and global post conditions defining a condition of the basic call state model during the call after execution of the service.

2. The method according to claim 1, wherein the step of pairwise comparing utilizes verification rules of the format {P} S {Q}, P being a first condition relating to the execution of the service, S being the execution of the service, and Q being a second condition relating to the execution of the service, and wherein interaction is detected as being present if P does not hold, or if P holds while {P} S {Q} does not hold.

3. The method according to claim 1, further comprising the step of comparing data exchanged between the service and the basic call state model.

* * * * *